(12) United States Patent
Itsuki et al.

(10) Patent No.: US 11,160,640 B2
(45) Date of Patent: Nov. 2, 2021

(54) ORTHODONTIC IMPLANT STRUCTURE AND ORTHODONTIC IMPLANT JIG

(71) Applicants: Yasuhiro Itsuki, Tokyo (JP); OKADA MEDICAL SUPPLY CO., Tokyo (JP)

(72) Inventors: Yasuhiro Itsuki, Tokyo (JP); Norihisa Okada, Tokyo (JP); Junichi Kono, Ichikawa (JP)

(73) Assignees: Yasuhiro Itsuki, Tokyo (JP); OKADA MEDICAL SUPPLY CO., Tokyo (JP)

( * ) Notice: Subject to any disclaimer, the term of this patent is extended or adjusted under 35 U.S.C. 154(b) by 0 days.

(21) Appl. No.: 15/753,141

(22) PCT Filed: Aug. 17, 2016

(86) PCT No.: PCT/JP2016/073993
§ 371 (c)(1),
(2) Date: Feb. 15, 2018

(87) PCT Pub. No.: WO2017/030143
PCT Pub. Date: Feb. 23, 2017

(65) Prior Publication Data
US 2018/0228579 A1 Aug. 16, 2018

(30) Foreign Application Priority Data

Aug. 18, 2015 (JP) .............................. JP2015-161298

(51) Int. Cl.
*A61C 8/00* (2006.01)
*A61C 7/00* (2006.01)

(52) U.S. Cl.
CPC .............. *A61C 8/0096* (2013.01); *A61C 7/00* (2013.01); *A61C 8/009* (2013.01); *A61C 8/0045* (2013.01)

(58) Field of Classification Search
CPC ..... A61C 8/0096; A61C 8/0045; A61C 8/009; A61C 7/00; A61C 7/10; A61C 7/22;
(Continued)

(56) References Cited

U.S. PATENT DOCUMENTS 8,303,299 B2  11/2012  Itsuki et al.
9,131,992 B2   9/2015  Itsuki et al.
(Continued)

FOREIGN PATENT DOCUMENTS

JP    2004057729 A  *  2/2004
JP    4680209 B       2/2011
(Continued)

OTHER PUBLICATIONS

Seo et al., WO 2012023736 A2—machine translation in Google (Year: 2012).*
(Continued)

*Primary Examiner* — Nicholas D Lucchesi
*Assistant Examiner* — Mirayda A Aponte
(74) *Attorney, Agent, or Firm* — Nixon Peabody LLP; Jeffrey L. Costellia

(57) ABSTRACT

An orthodontic implant structure (2) that is used by being implanted in bone in an oral cavity includes a first screw (6, 6B) having a screw body (6b) and an engaging portion (14), a plate securing implement (12, 13), a second screw, and a base plate having a first surface (4p) and a second surface (4q) and in which a first attachment hole (24A, 24B) and a second attachment hole (26) are formed.

10 Claims, 10 Drawing Sheets

(58) Field of Classification Search
CPC ... A61C 8/0093; A61C 8/0037; A61C 8/0018; A61C 8/0089; A61F 13/10; A61B 17/8023; A61B 17/808; A61B 17/58; A61B 17/14; A61B 17/16; A61B 17/80; A61B 5/01
USPC ........ 433/18, 20, 22, 24, 173–174; 606/280, 606/281
See application file for complete search history.

(56) References Cited

U.S. PATENT DOCUMENTS

| | | | | |
|---|---|---|---|---|
| 2005/0240187 A1* | 10/2005 | Huebner | ................ | A61B 17/80 606/71 |
| 2010/0112506 A1 | 5/2010 | Itsuki et al. | | |
| 2013/0122446 A1 | 5/2013 | Lee | | |
| 2014/0038122 A1* | 2/2014 | Itsuki | ...................... | A61C 7/00 433/18 |

FOREIGN PATENT DOCUMENTS

| | | |
|---|---|---|
| KR | 20-0353672 | 6/2004 |
| KR | 10-2013-0016540 | 2/2013 |
| RU | 118547 U1 | 7/2012 |
| WO | WO 99/42048 | 8/1999 |
| WO | WO 2008/090979 A1 | 7/2008 |
| WO | WO-2009/088165 A1 | 7/2009 |
| WO | WO-2012/023736 A2 | 2/2012 |
| WO | WO-2012023736 A2 * | 2/2012 ............... A61C 7/22 |
| WO | WO-2012/099103 | 7/2012 |
| WO | WO-2014/163154 A1 | 10/2014 |
| WO | WO-2014163154 A1 * | 10/2014 ........... A61C 8/0096 |
| WO | WO-2015/063625 A1 | 5/2015 |

OTHER PUBLICATIONS

International Search Report for PCT/JP2016/073993 dated Oct. 18, 2016.
Russian Office Action for Russian Application No. 2018108945, dated Dec. 5, 2018.
European Search Report (European Application No. 16837132.6) Dated Jun. 25, 2019.
European Search Report (Application No. 16837132.6) dated Feb. 27, 2019.
Japanese Notice of Allowance (Application No. 2015-161298) dated Sep. 29, 2020.
Korean Notice of Allowance (Application No. 10-2018-7007364) dated Oct. 20, 2020.

* cited by examiner

ORTHODONTIC IMPLANT STRUCTURE AND ORTHODONTIC IMPLANT JIG

TECHNICAL FIELD

The present invention relates to an orthodontic implant structure and an orthodontic implant jig. Priority is claimed on Japanese Patent Application No. 2015-161298, filed Aug. 18, 2015, the content of which is incorporated herein by reference.

BACKGROUND ART

In recent years, an orthodontic method in which a specific tooth is fixed in place, and this fixed tooth is then connected to a tooth that is to be moved (namely, to a tooth that is to undergo orthodontic treatment), and the tooth to undergo orthodontic treatment is then moved by being pulled has been used as a method of performing orthodontic treatment. In this orthodontic method, since the fixed tooth and the tooth to be moved are pulling on each other, there are cases when the fixed tooth is also moved in the direction of the tooth to be moved. Therefore, for example, a threaded implant on which a circular cylinder-shaped thread portion is formed is implanted in a bone of the jaw portion. A plate and wires and the like are fixed to this implant, and an end portion of this plate and wires and the like are fixed to a tooth. As a result, movement of the fixed tooth is suppressed, and orthodontic treatment can proceed.

For example, in Patent Document 1, an orthodontic implant structure is disclosed in which a base plate is fixed in place using two screws that are screwed into a bone such as the jawbone or the like inside the oral cavity at a predetermined distance from each other. In the orthodontic treatment in which this implant structure is used, an upper structure is screwed onto the fixed base plate, and orthodontic treatment is performed on a row of teeth via this upper structure.

CITATION LIST

Patent Document

[Patent Document 1]
Japanese Unexamined Patent Application, First Publication No. 4680209

SUMMARY OF INVENTION

Technical Problem

However, the inventors of the present application discovered that, in a conventional orthodontic implant structure, since the base plate is directly supported by being pressed against a bone such as the jawbone (hereinafter, this may be referred to simply as 'a bone') or the like inside the oral cavity using a plurality of screws, with the passage of time, this bone sinks in the direction in which it is being pressed. If the bone sinks in this way, a gap gradually appears between the base plate and the bone. The base plate may consequently become unstable, and excessive play may be generated therein. In addition, if the base plate does become unstable, the straightening force applied to a row of teeth by the upper structural bodies, plates, and wires and the like that are connected to the base plate is reduced, and the effectiveness of the orthodontic treatment is decreased.

The present invention was conceived in order to solve the above-described problem, and it is an object of the present invention to provide an orthodontic implant structure that is able to stably support a base plate. It is a further object of the present invention to provide an orthodontic implant jig that is used in this type of orthodontic implant structure.

Solution to Problem

In order to achieve the aforementioned objects, a first aspect of the present invention is an orthodontic implant structure that is used by being implanted in a bone inside an oral cavity, and that includes a first screw having a screw body that is implanted in a bone and an engaging portion that is formed by forming a thread in a head portion of the screw body, a plate securing implement that is capable of being screwed into a thread, a second screw that is implanted in a bone and has a head portion, and a base plate having a first surface that is disposed facing the bone and a second surface that is disposed on an opposite side from the first surface, the base plate in which a first attachment hole and a second attachment hole are formed, the first attachment hole with which the engaging portion is capable of being engaged from the first surface, and the second attachment hole into which the second screw is capable of being inserted from the second surface and locking the head portion of the second screw.

In the orthodontic implant structure according to this first aspect, the base plate is attached by implanting the first screw in a bone such as a jawbone or the like, and engaging the first attachment hole from the first surface with the engaging portion that is protruding from this bone. In addition, by screwing the plate securing implement from the second surface of the base plate into the thread of the first screw that has been placed inside the first attachment hole, the base plate is fixed to the first screw. As a result, the base plate is directly supported in the direction from the first surface towards the second surface not by bone, but by the engaging portion of the first screw (and by the plate securing implement). In contrast, by inserting the second screw from the second surface of the base plate through the second attachment hole, and implanting the portion thereof that protrudes from the front of the first surface in the direction of insertion into a bone such as a jawbone or the like, the base plate is directly supported by the head portion of the second screw in the direction from the second surface towards the first surface. Accordingly, according to the above-described orthodontic implant structure, the first screw and the second screw are prevented from coming loose from the bone, but are instead firmly fixed to the bone. In addition, the base plate is not directly supported by bone, but is instead stably supported by the first screw and the second screw, and is stabilized above the bone.

A second aspect of the present invention is the orthodontic implant structure according to the first aspect, wherein the first screws is provided with a stopper that protrudes in a radial direction that is orthogonal to the screw axial direction at a position closer in the screw axial direction to the thread portion than the engaging portion. According to the orthodontic implant structure of this second aspect, since the base plate is gripped in the thickness direction thereof by the stoppers and by small screws, the base plate is supported even more stably.

A third aspect of the present invention is the orthodontic implant structure according to the first or second aspects, wherein a seating surface whose diameter becomes wider moving from the first surface towards the second surface is formed in the second attachment hole, and the head portion of the second screw has an abutting surface that abuts against the seating surface. According to the orthodontic implant structure of this third aspect, since the abutting surface abuts against the seating surface when the second screw in inserted from the second surface towards the first surface, the support provided to the base plate by the head portion of the second screw in a direction from the first surface towards the second surface is strengthened.

A fourth aspect of the present invention is the orthodontic implant structure according to any one of the first through third aspects, wherein the base plate is formed having a plate shape, and the base plate is provided with the first attachment hole, the second attachment hole, and an attachment portion to which an upper structure that is used for orthodontic treatment is removably attached, and a notch portion that enables a plate portion to be bent in a desired direction are formed between the first attachment holes or second attachment hole and the attachment portion.

According to the orthodontic implant structure of this fourth aspect, since the plate portion can be bent in a desired direction around the portion of the plate portion where the notch portion is formed between the first attachment hole or second attachment hole and the attachment portion, the position and orientation of the attachment portion changes in accordance with the orientation resulting from this bending. Namely, the position and orientation of the attachment portion can be freely altered so as to match the attitude desired for the upper structure that is attached to the attachment portion. Because of this, the position of the attachment portion can be easily adjusted so as to match the configuration and application of the upper structure even after the base plate has been fixed to the jawbone inside the oral cavity. For example, since the position of the attachment portion can be easily altered even if the position where the base plate is fixed deviates from the predetermined position, it is sufficient if the base plate is only fixed in an approximate position and there is no need for the base plate to be fixed in a precise position relative to the upper structure. Accordingly, these tasks are simplified, work efficiency is improved, and both labor and time are reduced. Moreover, by changing the formation positions, the orientation, and the number of formation locations and the like of the notch portions in the plate portion, the base plate can be bent to any desired configuration. Furthermore, since the upper structure can be positioned in a desired attitude without the number of parts used having to be increased, unlike the case of a conventional structure, there is no increase in structural complexity, and a reduction in cost can also be achieved.

A fifth aspect of the present invention is the orthodontic implant structure according to the fourth aspect, wherein the notch portion is formed by reducing the width of a predetermined location of the plate portion. According to the orthodontic implant structure of this fifth aspect, it is easier for the plate portion to be bent around the location where the width of the plate portion has been made smaller.

A sixth aspect of the present invention is an orthodontic implant jig that is fixed indirectly to bone using first screws, a plate securing implement, and a second screw, wherein the orthodontic implant jig has a first surface that is disposed facing the bone, and a second surface that is disposed on an opposite side from the first surface, and a first attachment hole with which the engaging portion is capable of bring engaged from the first surface and enabling the plate securing implement to be screwed into the thread provided in the engaging portion, and a second attachment hole into which the second screw is capable of being inserted from the second surface and locking the head portion of the second screw in place are formed in the orthodontic implant jig. According to the orthodontic implant jig of this sixth aspect, since the orthodontic jig is not supported directly by bone, but is instead supported directly by the first screw and the second screw, the orthodontic jig is fixed stably without any play therein. Accordingly, the upper structure, plates, and wires and the like can be stably supported by and fixed to this orthodontic jig.

Advantageous Effects of Invention

According to the orthodontic implant structure of the present invention, it is possible to stably support a base plate. Moreover, according to the orthodontic jig of the present invention, this orthodontic jig can be used in the orthodontic implant structure, so that the effectiveness of orthodontic treatment performed using an upper structure, a plate, and wires and the like can be increased.

DESCRIPTION OF EMBODIMENTS

Hereinafter, an orthodontic implant structure (referred to below simply as an implant structure) to which the present invention has been applied is described with reference to the drawings. Note that the drawings used in the following description are schematic views, and length, width, and thickness proportions and the like therein may not necessarily match those of an actual product, and may differ when appropriate.

Figure 1:
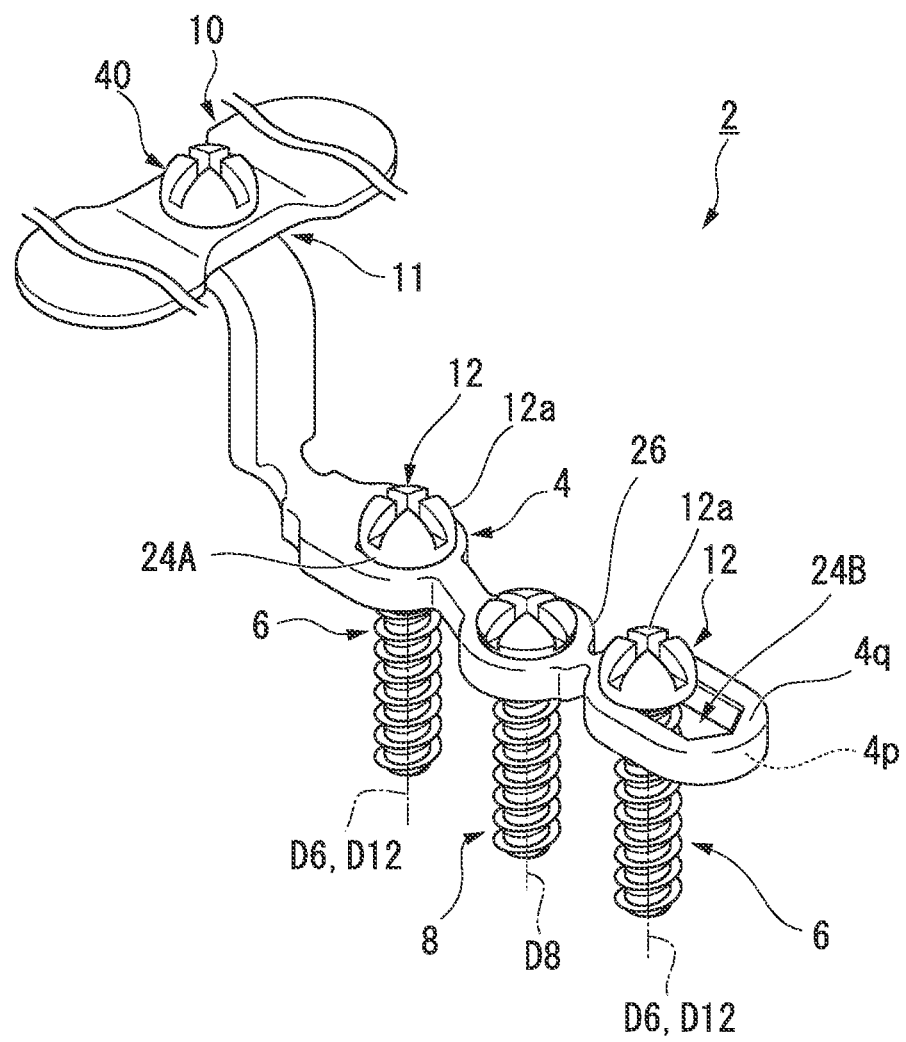
FIG. 1 is a perspective view representing an orthodontic implant structure according to an embodiment of the present invention.
Figure 2:
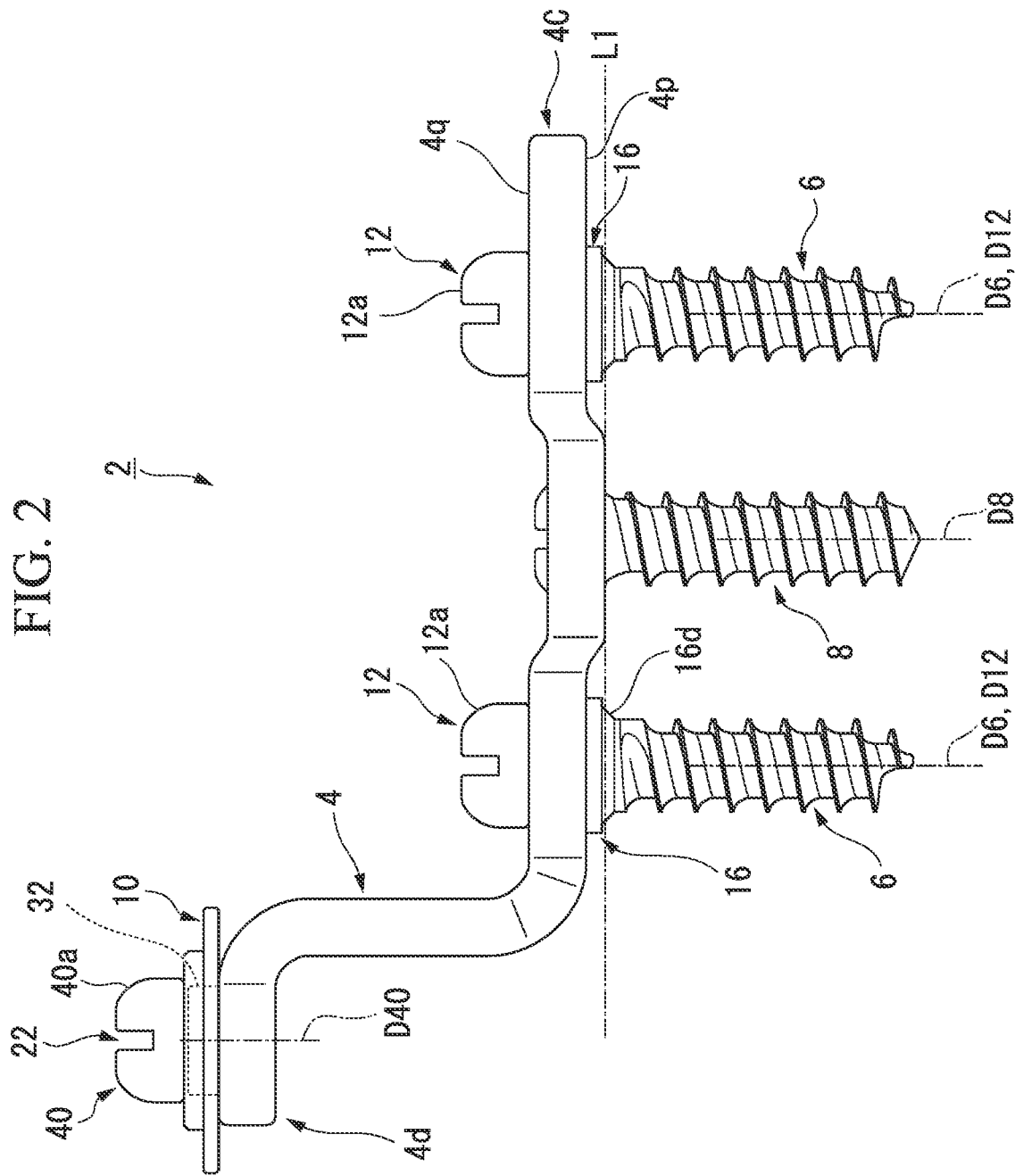
FIG. 2 is a side view representing the orthodontic implant structure according to an embodiment of the present invention.
Figure 3:
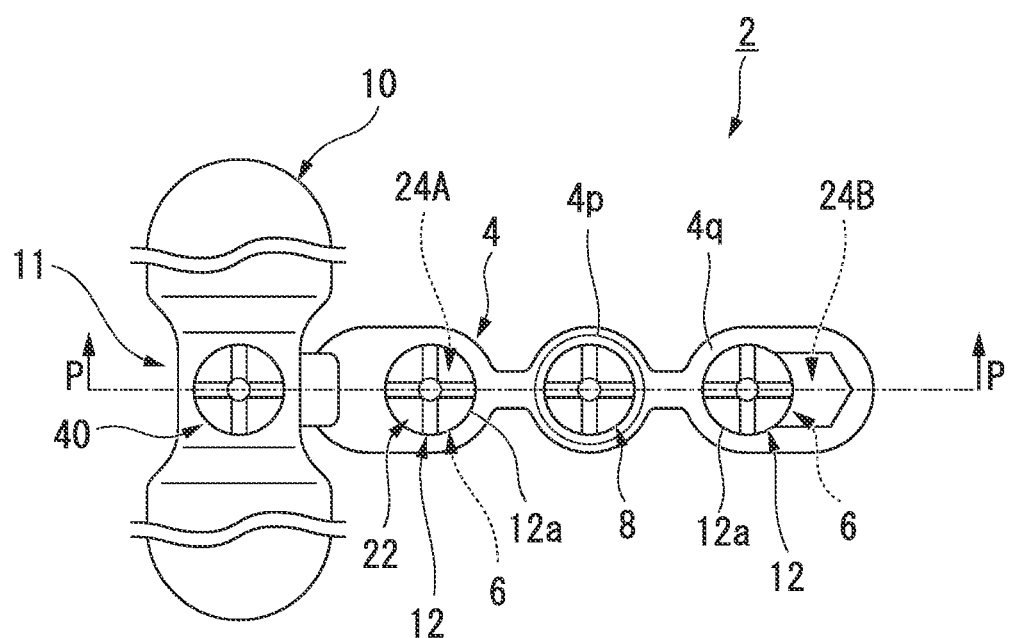
FIG. 3 is a plan view representing the orthodontic implant structure according to an embodiment of the present invention.
Figure 4:
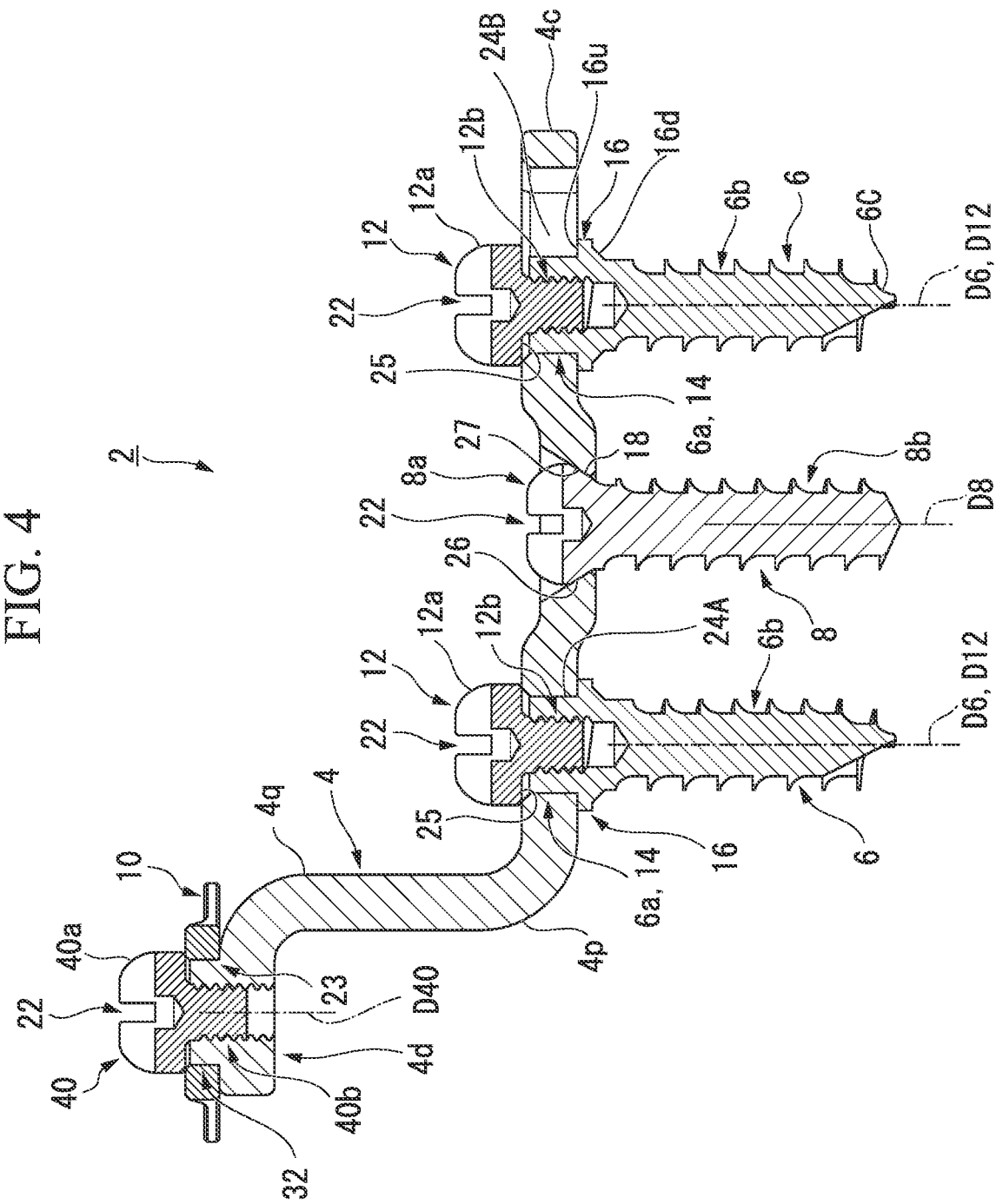
FIG. 4 is a cross-sectional view across a line P-P in FIG. 3 representing the orthodontic implant structure according to an embodiment of the present invention.

FIG. 1 through FIG. 4 are views representing an implant structure 2 according to an embodiment to which the present invention has been applied (hereinafter, this is referred to as 'the present embodiment'). FIG. 1 is a perspective view, FIG. 2 is a side view, FIG. 3 is a plan view, and FIG. 4 is a cross-sectional view across a line P-P shown in FIG. 3.

As is shown in FIG. 1, the implant structure 2 is provided with a first screw 6, a small screw 12, a second screw 8, a base plate (i.e., an orthodontic implant jig) 4, an upper structure 10, and a small screw 40. The implant structure 2 is used by being implanted in the bone (not shown in the drawings) of a jaw portion inside an oral cavity. Specifically, the implant structure 2 is used in the following manner in order to move a tooth in a predetermined direction. Namely, the first screw 6 and the second screw 8 are implanted in bone, and the base plate 4 is supported on the first screw 6 and the second screw 8. The upper structure 10 is then connected and fixed to the base plate 4, and the implant structure 2 is placed inside the oral cavity. An orthodontic bracket or the like (not shown in the drawings) is then adhered via brazing or the like to the upper structure 10, and the orthodontic bracket is connected to a predetermined tooth (not shown in the drawings) via orthodontic wire, elastic, and springs and the like (not shown in the drawings).

Figure 5:
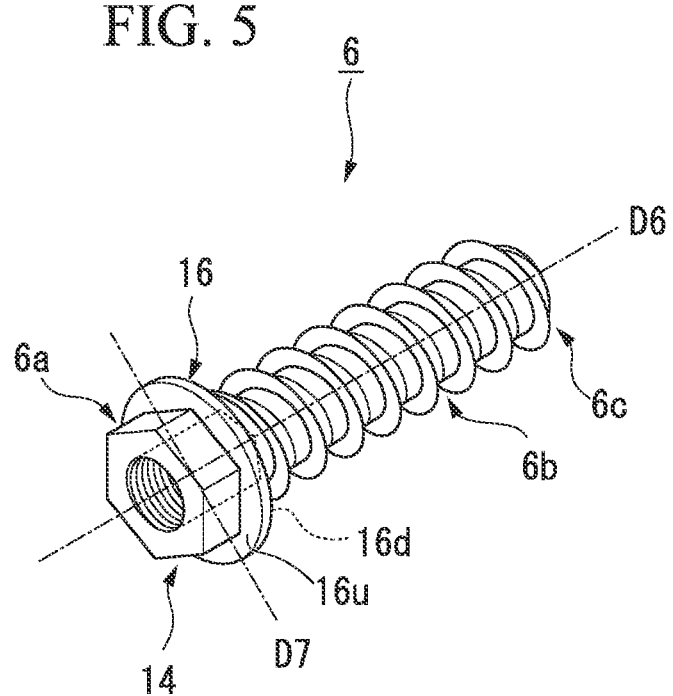
FIG. 5 is a perspective view representing a first screw of the orthodontic implant structure according to an embodiment of the present invention.

FIG. 5 is a perspective view of a first screw 6. The first screw 6 is a component that is formed from a highly biocompatible material such as, for example, titanium or a titanium alloy or the like. The first screw 6 has a first head portion 6a, and a first screw body 6b that protrudes in a screw axial direction D6 from the first head portion 6a and is implanted in bone. Here, the first head portion 6a corresponds to a first screw head portion of the present application, and the first screw body 6b corresponds to a screw body.

The first head portion 6a has an engaging portion 14 in which a female thread is formed. This female thread is open on an upper surface (i.e., side) of the first head portion 6a, and is formed on a side wall of a recessed portion that is formed extending from this upper surface in the screw axial direction D6 so as to penetrate an internal portion of the head portion 6a in a direction towards the first screw body 6b. Note that the depth (i.e., the length) of this female thread in the screw axial direction D6 from the upper surface of the first head portion 6a is not particularly restricted provided that the entirety of a male thread of the small screw (i.e., plate securing implement) 12 (described below) is able to be screwed into this female thread. In the present embodiment, a distal end in the penetration direction of the female thread does not reach the interior of the first screw body 6b, however, a bottom end of the recessed portion in the depth direction from the upper surface of the first head portion 6a does reach as far as the interior of the first screw body 6b.

In the present embodiment, the entire first head portion 6a forms the engaging portion 14 (see FIG. 4), and is formed in the shape of a hexagonal column. The configuration of the engaging portion 14 when looked at in plan view is not particularly restricted. However, if, for example, the configuration of the engaging portion 14 when looked at in plan view is polygonal, then if the inner circumferential configurations of first attachment holes 24A and 24B (described below: see FIG. 1 and FIG. 10) in the base plate 4 are also formed as polygonal shapes so as to match the polygonal engaging portion 14, the corner portions of the respective polygonal shapes mutually lock each other in place so that any rotation of the base plate 4 in the circumferential direction of the engaging portion 14 is effectively suppressed.

A male thread is formed on an outer circumferential portion of the first screw body 6b. The length in the screw axial direction D6 of the first screw body 6b is not particularly restricted provided that, when the first screw 6 is implanted in bone, it is stably supported by this bone. In the first screw body 6b, the end portion that protrudes in the screw axial direction D6 from the first head portion 6a has a tapered shape. In the present embodiment, an internal angle of the tapered portion of this protruding end portion is set to 120 degrees. However, the internal angle of the tapered portion of the protruding end portion is not particularly restricted and may be set to any appropriate angle.

A stopper 16 is provided on the first screw 6 at a position that is closer to the first screw body 6b in the screw axial direction D6 than the engaging portion 14. The stopper 16 is formed so as to protrude from an end portion of the first screw body 6b that is close to the first head portion 6a in a radial direction D7 that is orthogonal to the screw axial direction D6. Looking at a cross-section of the stopper 16 taken in the screw axial direction D6, an upper surface 16u of the stopper 16, which is closer to the engaging portion 14, is parallel to the radial direction D7, while a lower surface 16d of the stopper 16, which is closer to the first screw body 6b, is sloped such that, as it approaches a base end portion from a distal end portion that is enlarged in the radial direction D7, it gradually moves closer to a distal end 6c in the implanting direction of the first screw body 6b. As a result of the stopper 16 being formed in this shape, the first screw body 6b can be easily implanted in bone, while any stress felt by the patient receiving the orthodontic treatment is alleviated. Note that the stopper 16 of the present embodiment is formed so as to protrude in the radial direction D7 from the entire first screw body 6b in the circumferential direction thereof, namely, is formed in a toroidal shape. However, the shape of the stopper 16 is not particularly restricted. For example, the stopper 16 may also be formed such that it protrudes from only a portion in the circumferential direction of the first screw body 6b.

The small screws 12 are components that are formed from a highly biocompatible material such as, for example, titanium or titanium alloy or the like. As is shown in FIG. 4, the small screws 12 are able to be screwed into the female thread that is formed in the engaging portions 14 of the first screws 6, and have a head portion 12a, and a small screw body 12b that protrudes in an axial direction D12 from the head portion 12a.

A groove 22 having the shape of a plus sign when seen in plan view (hereinafter, these may be referred to as plus groove: see FIG. 3) are formed in the head portion 12a in order that a tool or the like may be inserted therein when the small screw 12 is being attached to the first screw 6. A central upper end portion of the head portion 12a that is in contact with the plus groove 22 is beveled. Note that the configuration of the head portion 12a and groove 22 is not particularly restricted provided that the configuration does not impede the handling of the small screw 12 and the ease of attaching them to the first screw 6.

A male thread that is capable of being screwed into the female thread that is formed in the first head portion 6a of the first screw 6 is formed on an outer circumferential portion of each small screw body 12b. The length in the axial direction D12 of the male thread that is formed on the small screw body 12b is not particularly restricted provided that the base plate 4 (described below) can be stably supported between the head portion 12a of the small screw 12 and the stopper 16 of the first screws 6.

Figure 6:
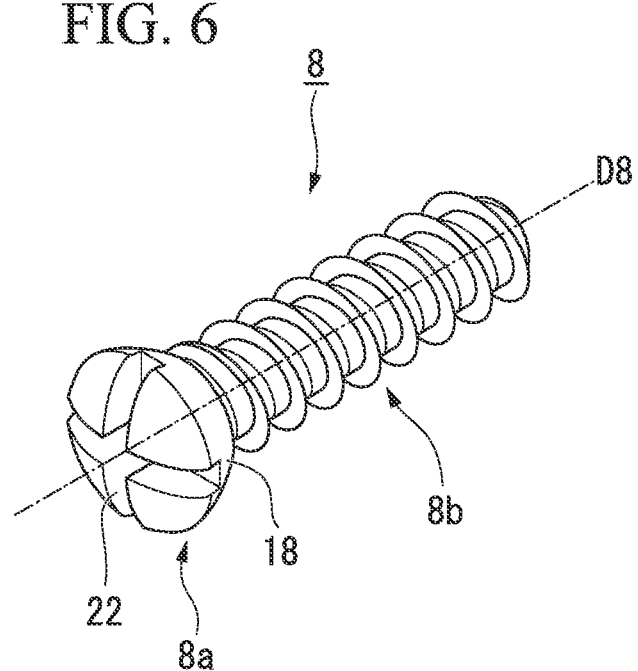
FIG. 6 is a perspective view representing a second screw of the orthodontic implant structure according to an embodiment of the present invention.
Figure 7:
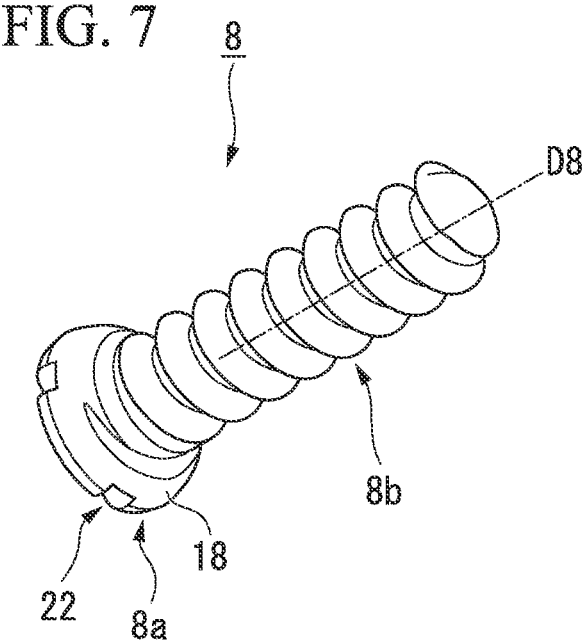
FIG. 7 is a perspective view representing a second screw of the orthodontic implant structure according to an embodiment of the present invention.
Figure 8:
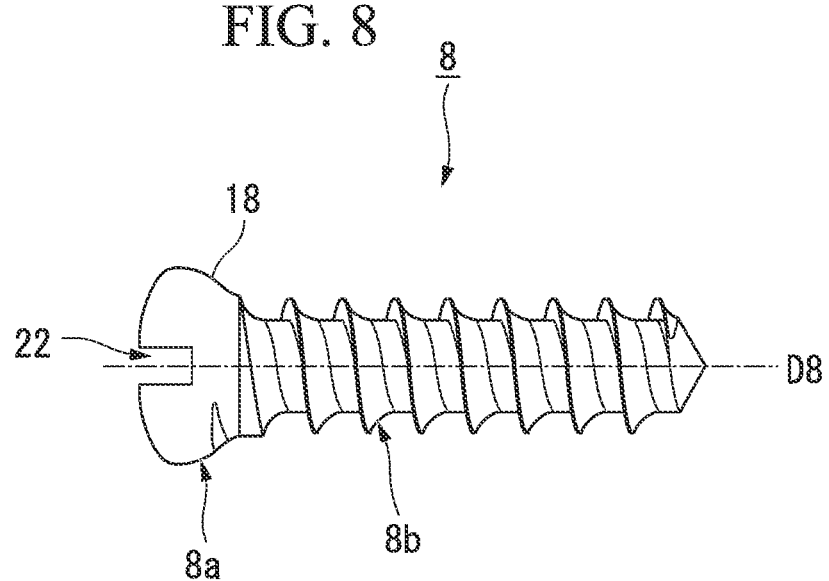
FIG. 8 is a side view representing a second screw of the orthodontic implant structure according to an embodiment of the present invention.

FIG. 6 through FIG. 8 are views representing the second screw 8. FIG. 6 is a perspective view, FIG. 7 is a perspective view as seen from a different direction from that in FIG. 6, and FIG. 8 is a side view. The second screw 8 is a component that is formed from a highly biocompatible material such as, for example, titanium or titanium alloy or the like. The second screw 8 has a second head portion 8a, and a second screw body 8b that protrudes in a screw axial direction D8 from the second head portion 8a and is implanted in bone. Here, the second head portion 8a corresponds to a second screw head portion of the present application.

The second head portion 8a has an abutting surface 18. The abutting surface 18 is provided extending around an entire side wall in the circumferential direction of the second head portion 8a. As is shown in FIG. 6 through FIG. 8, the second head portion 8a is provided with the same diameter as the second screw body 8b in a join position where it joins to the second screw body 8b, and is formed such that the diameter thereof expands as it moves in the screw axial direction D8 away from the second screw body 8b.

The plus groove 22 is formed in the second head portion 8a in order that a tool or the like may be inserted therein when the second screw 8 is being implanted in bone. A central upper end portion of the second head portion 8a that is in contact with the plus groove 22 is beveled. Note that the configuration of the second head portion 8a and grooves 22 is not particularly restricted provided that the handling of the second screw 8 and the ease of implanting it in bone are not impeded.

A male thread is formed on an outer circumferential portion of the second screw body 8b. The length in the screw axial direction D8 of the second screw body 8b is not particularly restricted provided that, when the second screw 8 is being implanted in bone, it is stably supported by this bone. In the second screw body 8b, the end portion that protrudes in the screw axial direction D8 from the second head portion 8a has a tapered shape. In the present embodiment, an internal angle of the tapered portion of this protruding end portion is set to 120 degrees. However, the internal angle of the tapered portion of the protruding end portion is not particularly restricted and may be set to any appropriate angle. In the present embodiment, in order to stabilize the second screw body 8 by screwing it into bone as deeply as possible, the male thread that is formed on the outer circumferential portion of the second screw body 8b is formed right up to the end portion of the second portion 8a that is next to the second screw body 8b.

Figure 9:
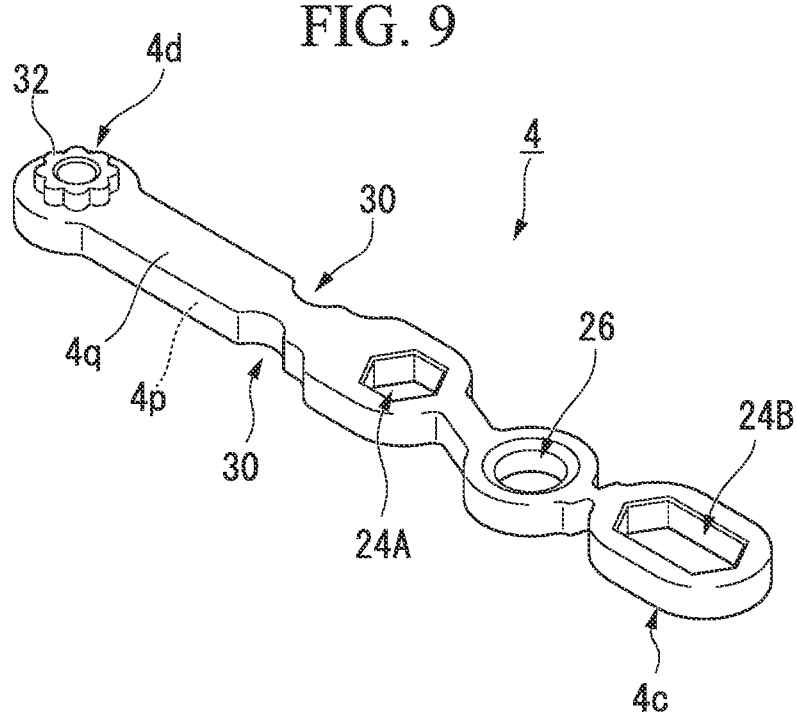
FIG. 9 is a perspective view representing a base plate (i.e., an orthodontic implant jig) according to an embodiment of the present invention.
Figure 10:
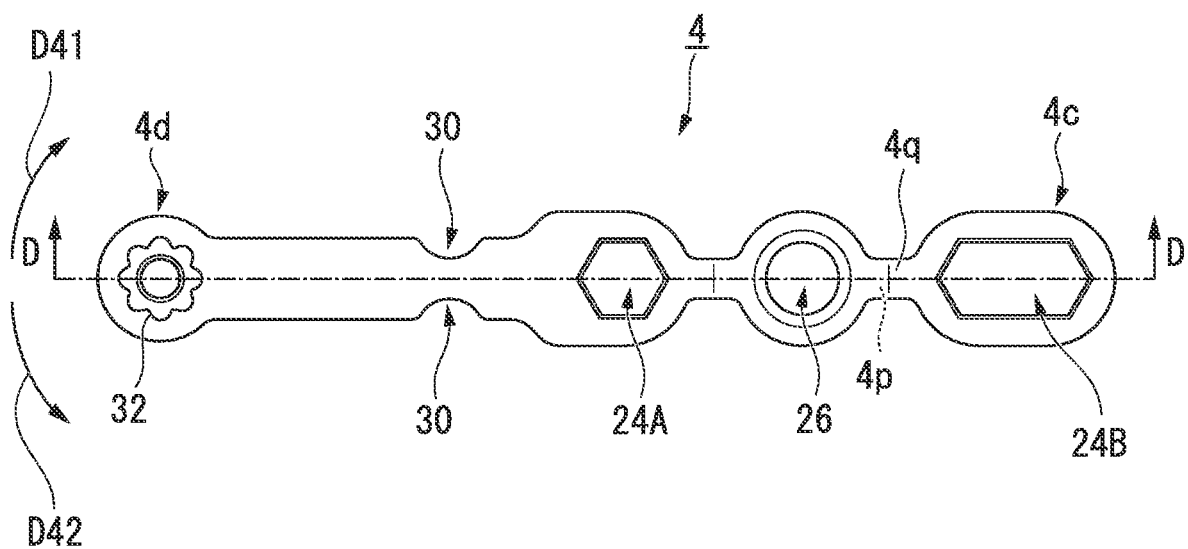
FIG. 10 is a plan view representing the base plate (i.e., the orthodontic implant jig) according to an embodiment of the present invention.
Figure 11:
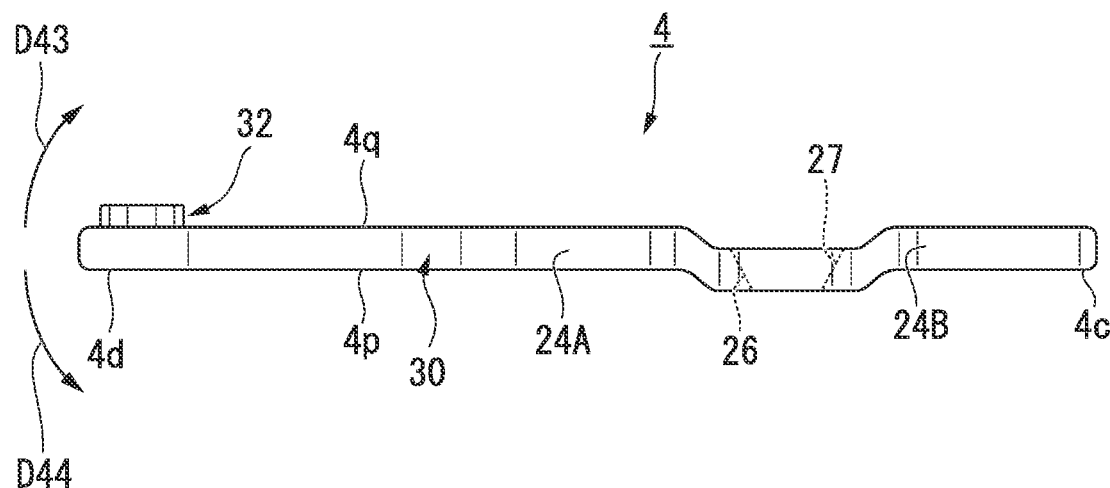
FIG. 11 is a side view representing the base plate (i.e., the orthodontic implant jig) according to an embodiment of the present invention.
Figure 12:
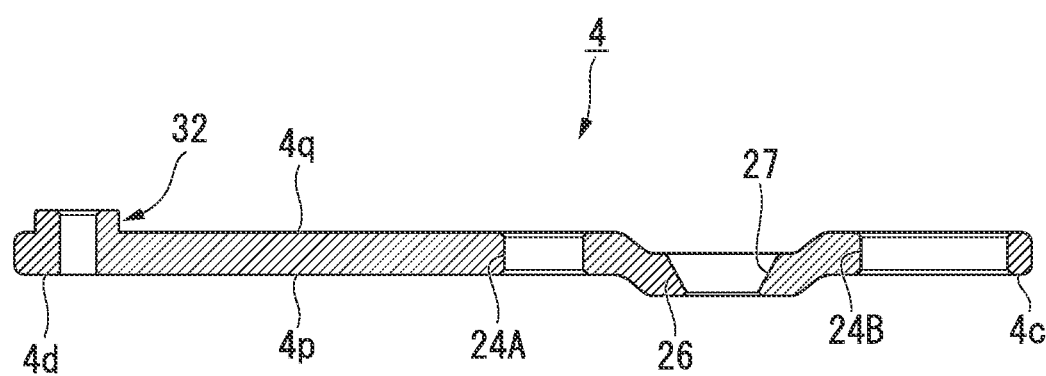
FIG. 12 is a cross-sectional view across a line D-D in FIG. 10 representing the base plate (i.e., the orthodontic implant jig) according to an embodiment of the present invention.

FIG. 9 through FIG. 12 are views representing the base plate 4. FIG. 9 is a perspective view, FIG. 10 is a plan view, FIG. 11 is a side view, and FIG. 12 is a cross-sectional view across a line D-D shown in FIG. 10. The base plate 4 is a component that is formed from a highly biocompatible material such as, for example, titanium or a titanium alloy or the like. As is shown in FIG. 9 through FIG. 12, the base plate 4 is formed in an elongated shape (i.e., is formed as a belt-shaped object) having a predetermined thickness, and has a first surface 4p that is disposed facing in the longitudinal direction towards a bone such as the jawbone or the like inside an oral cavity, and a second surface 4q that is disposed on the opposite side from the first surface 4p.

A plurality of (i.e., a total of three in the example given in the present embodiment) attachment holes in the form of first attachment holes 24A and 24B and a second attachment hole 26 are formed a predetermined distance apart from each other in the longitudinal direction in an end portion 4c which is located at one end in the longitudinal direction of the base plate 4. In the present embodiment, the two first attachment holes 24A and 24B and the second attachment hole 26, which is disposed between the two first attachment holes 24A and 24B, are located in a portion that occupies substantially half of the base plate 4 in the longitudinal direction of the base plate 4, and that includes the end portion 4c. Note that the locations of the first attachment holes 24A and 24B and the second attachment hole 26 are not particularly restricted.

The first attachment holes 24A and 24B are formed such that the engaging portions 14 of the first screws 6 are able to engage therein from the first surface 4p. In the present embodiment, an inner periphery of the first attachment hole 24A is formed in a hexagonal shape, which is the same cross-sectional shape as the shape of the first head portion 6a (namely, in the present embodiment, as the shape of the engaging portion 14) of the first screw 6 when this is seen in plan view, so that the engaging portion 14 is able to be engaged in the first attachment hole 24A. In addition, an inner periphery of the first attachment hole 24B is also formed in a hexagonal shape when seen in plan view, however, the inner periphery of the first attachment hole 24B is formed as an elongated hole whose sides that extend in parallel with the longitudinal direction of the base plate 4 are elongated. In this way, by forming the first attachment hole 24B as an elongated hole extending in the longitudinal direction of the base plate 4, even in cases in which the distance between the two first screws 6 and 6 is not constant, or in cases in which the two first screws 6 and 6 are unable to be implanted with their respective screw axial directions D6 aligned in parallel with each other, by engaging the engaging portion 14 of one first screw 6 in the first attachment hole 24A, and then engaging the engaging portion 14 of the other first screw 6 in the first attachment hole 24B within the range of the elongated hole, it is possible to attach the base plate 4 to the two first screws 6.

An edge portion 25 that protrudes within the aperture is provided on an inner peripheral edge of the first attachment holes 24A and 24B that is closer to the second surface 4q. Each edge portion 25 is sandwiched between the engaging portion 14 and the head portion 12a of the small screw 12 (see FIG. 4) when the male thread that is formed on the small screw body 12b of each small screw 12 is screwed into the female thread that is formed in the engaging portion 14 of each first screw 6.

The second attachment hole 26 is formed such that the second screw body 8b and the second head portion 8a of the second screw 8 are inserted in that sequence from the second surface 4q into the second attachment hole 26, and the second head portion 8a is anchored within this hole. In the present embodiment, the second attachment hole 26 becomes gradually wider in diameter moving from the first surface 4p towards the second surface 4q so as to conform to the outer shape of the second head portion 8a of the second screw 8. Accordingly, a seating surface 27 whose diameter becomes gradually wider moving from the first surface 4p towards the second surface 4q is formed on a side wall of the second attachment hole 26. The abutting surface 18 of the second screw 8 is able to abut against the seating surface 27.

As is shown in FIG. 2, FIG. 11, and FIG. 12, in the present embodiment, the portion in the longitudinal direction of the base plate 4 where the second attachment hole 26 is formed is indented slightly so as to protrude in the direction in which second screw body 8b protrudes when the second screw 8 is inserted into the second attachment hole 26. The protrusion height of the portion where the second attachment hole 26 is formed is substantially equivalent to the thickness of the stopper 16 of the first screw 6. As a result of this indentation being formed in this manner, when the base plate 4 is being supported by the first screws 6 and the second screw 8, the first surface 4p in the portion where the second attachment hole 26 is formed and the lower surface 16d of the stopper 16 of the first screws 6 (in other words, a virtual line L1 shown in FIG. 2) abut against an upper surface of the bone, and this enables the base plate 4 to be easily positioned. Note that the base plate 4 shown in FIG. 2 is just one example thereof, and it is also possible for the base plate 4 to not be indented.

In the present embodiment, in the longitudinal direction of the base plate 4, the width of the base plate 4 becomes narrower between the first attachment hole 24A and the second attachment hole 26, and also between the first attachment hole 24B and the second attachment hole 26. As a result, a lightening of the weight of the base plate 4 can be achieved. Moreover, it is also easy to bend the base plate 4 between the first attachment hole 24A and the second attachment hole 26, and between the first attachment hole 24B and the second attachment hole 26. In addition, notch portions 30 and 30 are formed opposite each other on either side of the axis of the base plate 4 in an end portion 4d in the longitudinal direction of the base plate 4 where the first attachment holes 24A and 24B and the second attachment hole 26 are not formed. An attachment portion 32 that is used to attach the upper structure 10 (described below) to the base plate 4 is provided on the end portion 4d.

The pair of notch portions 30 and 30 are formed by cutting substantially circular arc-shaped notches in peripheral edges of the base plate 4 towards a center in a width direction thereof such that the width of the base plate 4 is shortened from the two sides thereof. According to this structure, by fixing the first attachment holes 24A and 24B and the second attachment hole 26 of the base plate 4, and then applying force in a first bending direction D41, which is indicated by an arrow in FIG. 10, to a portion of the base plate 4 that includes the attachment portion 32 so as to rotate this portion around the position where the notch portions 30 are formed, the portion of the base plate 4 that includes the attachment portion 32 can be easily bent in the first bending direction D41. In the same way, by applying force in a second bending direction D42, which is indicated by an arrow in FIG. 10, to a portion of the base plate 4 that includes the attachment portion 32 so as to rotate this portion around the position where the notch portions 30 are formed, the portion of the base plate 4 that includes the attachment portion 32 can be easily bent in the second bending direction D42.

Although not shown in the drawings, it is also possible to provide a notch portion in the first surface 4p or the second surface 4q of the base plate 4 that is formed by reducing the plate thickness of the base plate 4 over the entire width direction thereof.

By fixing the substantially half portion of the base plate 4 shown in FIG. 9 through FIG. 12 where the first attachment holes 24A and 24B and the second attachment hole 26 are formed, and then applying force to this substantially half portion that includes the attachment portion 32 such that this substantially half portion that includes the attachment portion 32 is bent in a third bending direction D43, which is indicated by an arrow in FIG. 11, and then by additionally fixing the substantially half portion that includes the attachment portion 32, and then applying force to the distal end portion that includes the attachment portion 32 such that this distal end portion that includes the attachment portion 32 is bent in a fourth bending direction D44, which is indicated by an arrow in FIG. 11, this base plate 4 can be formed into a crank-shaped base plate 4 that, as is shown in FIG. 1 through FIG. 4, is bent substantially perpendicularly at two locations in the longitudinal direction thereof. However, it is also possible for the base plate 4 to be bent after it has been supported and fixed in position above the bone in the shape shown in FIG. 9 through FIG. 12 using the first screws 6, the small screws 12, and the second screw 8.

The attachment portion 32 is provided so as to protrude outwards for a predetermined length from the second surface 4q of the base plate 4. Moreover, as is shown in FIG. 10, when seen in plan view, the attachment portion 32 is formed in a star shape having a plurality (eight in the example illustrated for the present embodiment) of projections at equidistant intervals in a circumferential direction thereof. A through hole that penetrates through the attachment portion 32 is formed in the center of the attachment portion 32, and this through hole penetrates right through the base plate 4. A female thread is formed on a side wall of the through hole in the attachment portion 32. The portion of the base plate 4 where the attachment portion 32 is provided is formed having an expanded diameter when seen in plan view. Note that the attachment portion 32 may also be provided such that it protrudes outwards for a predetermined length from the first surface 4p of the base plate 4. It is also possible, moreover, for a plurality of the attachment portions 32 to be provided.

As is shown in FIG. 1 through FIG. 4, the upper structure 10 is a component that is formed from a highly biocompatible material such as SUS (stainless steel) or the like. As is shown in FIG. 1 through FIG. 4, the upper structure 10 of the present embodiment is a belt-shaped object having a predetermined thickness.

A base portion 11 is provided in the center in the longitudinal direction of the upper structure 10. An insertion hole 23 whose shape corresponds to the star-shaped projection of the attachment portion 32 that is provided on the base plate 4 is formed in the base portion 11. As a consequence, when the insertion hole 23 in the upper structure 10 is inserted into the attachment portion 32 of the base plate 4, the angle of the upper structure 10 relative to the base plate 4 at the time of this insertion is kept the same. In the present embodiment, since the attachment portion 32 is formed substantially in a star shape having eight projections when seen in plan view, the mounting angle of the upper structure 10 relative to the base plate 4 can be adjusted at 45 degree angular intervals.

Note that the shape of the upper structure 10 is not particularly restricted provided that it is able to be mounted onto the mounting portion 32 of the base plate 4. For example, it is also possible for the upper structure 10 to extend in only one direction from the attachment portion 32, for example, such as if the upper structure 10 were to be attached to the attachment portion 32 of the base plate 4 with the base portion 11 being provided on an end portion on one side in the longitudinal direction of the upper structure 10. Moreover, it is also possible to additionally provide the upper structure 10 with a structure in which an orthodontic bracket or the like (not shown in the drawings) is adhered via brazing or the like to the upper structure 10, and orthodontic wire, elastic, and springs and the like (not shown in the drawings) are then connected to this orthodontic bracket or the like.

The small screw 40 is a component that is formed from a highly biocompatible material such as, for example, titanium or titanium alloy or the like. The small screw 40 is able to be screwed into the female thread that is formed in the attachment portion 32 of the base plate 4, and has a head portion 40a, and a small screw body 40b that protrudes in an axial direction D40 from the head portion 40a.

The grooves 22 are formed in the head portion 40a in order that a tool or the like may be inserted therein when the small screw 40 is being attached to the attachment portion 32 of the base plate 4. A central upper end portion of the head portion 40a that is in contact with the plus grooves 22 is beveled. Note that the configuration of each head portion 40a and grooves 22 is not particularly restricted provided that the handling of the small screw 40a and the ease of attaching it to the attachment portion 32 are not impeded.

A male thread that is capable of being screwed into the female thread that is formed in the attachment portion 32 of the base plate 4 is formed on an outer circumferential portion of the small screw body 40b. In the present embodiment, the length in the axial direction D40 (see FIG. 2 and FIG. 4) of the male thread that is formed on the small screw body 40b is shorter than the depth in the thickness direction of the base plate 4 (namely, in a direction heading from the second surface 4q towards the first surface 4p) of the female thread that is formed in the attachment portion 32 of the base plate 4. Note that the length of this male thread in the axial direction D40 is not particularly restricted provided that the small screw 40 is able to be stably supported on the base plate 4.

Next, a method used to implant the implant structure 2 in a bone (not shown in the drawings) such as a jawbone within an oral cavity (hereinafter, this may be referred to simply as an 'implanting method') will be described with reference to FIG. 1 through FIG. 4.

When implanting the implant structure 2 in bone, firstly, anchor positions (in other words, implanting positions for the first screws 6 and the second screw 8) for the implant structure 2 in a bone of the jaw (for example, a central portion in the palatine bone of the upper jaw or the like) inside the oral cavity of a patient requiring orthodontic treatment are determined. Next, using a tool such as a specialized screwdriver (not shown in the drawings), a predetermined number (two in the present embodiment) of the first screws 6 are implanted in the bone in the screw axial direction D6 at a predetermined distance from each other while being rotated. The screwing operation at this time is ended when the lower surface of the stopper 16 of the first screws 6 is at a position where it is in contact with bone or with an adhesive film. At this time, since the stopper 16 is abutting against bone or against the surface of an adhesive film, the first screws 6 can be prevented from sinking into the bone.

Next, the first attachment hole 24A of the base plate 4 is engaged with the engaging portion 14 of one of the first screws 6 out of the two first screws 6 that have been implanted, and the first attachment hole 24B is engaged with the engaging portion 14 of the other first screw 6. The base plate 4 is then positioned with the first surface 4p facing the bone. At this time, even if, for example, the respective screw axial directions D6 of the two first screws 6 are not parallel with each other, the base plate 4 can be attached to the two first screws 6 within the range of the longitudinal direction of the first attachment hole 24B. As a consequence, a high-precision screw implanting operation is unnecessary thereby enabling the operation to be simplified.

Next, using a tool such as a specialized screwdriver (not shown in the drawings) or the like, the male thread formed on the small screw body 12b of each small screw 12 is screwed into the female thread that is formed in the engaging portion 14 so as to fix the base plate 4 in position. As a result, the base plate 4 is supported by the first screws 6. Note that, as is described above, even if the respective screw axial directions D6 of the two implanted first screws 6 are not mutually in parallel, since the base plate 4 is formed from titanium or the like, the base plate 4 can be suitably bent. As a consequence of this, the positions of the first attachment holes 24A and 24B can be adjusted to match the engaging portions 14.

Next, using a tool such as a specialized screwdriver (not shown in the drawings) or the like, the second screw body 8b of the second screw 8 is inserted from the second surface 4q into the second attachment hole 26 in the base plate 4. The second screw body 8b of the second screw 8 is then implanted in the screw axial direction D8 while the portion thereof that is protruding from the first surface 4p is being rotated. The screwing operation at this time is ended when the abutting surface 18 of the second screw 8 is at a position where it is abutting against the seating surface 27 of the second attachment hole 26.

Next, the insertion hole 23 in the upper structure 10 is inserted into the attachment portion 32 of the base plate 4. Thereafter, using a tool such as a specialized screwdriver (not shown in the drawings) or the like, the male thread formed on the small screw body 40b of the small screw 40 is screwed into the female thread that is formed in the attachment portion 32 so as to fix the upper structure 10 to the base plate 4. Thereafter, an orthodontic bracket or the like (not shown in the drawings) is adhered via brazing or the like to the upper structure 10, and orthodontic securing implements such as orthodontic wire, elastic, and springs and the like (not shown in the drawings) are connected to this orthodontic bracket or the like. The tooth or row of teeth that are to undergo orthodontic treatment are then joined to these orthodontic securing implements. By performing the above-described steps, the implant structure 2 can be implanted in a bone (not shown in the drawings) such as the jawbone or the like inside an oral cavity, and the tooth or row of teeth that are to undergo orthodontic treatment can be fixed to the implant structure 2.

For example, if the treatment involves moving a tooth by pulling it from a different direction, or if the tooth to be moved is changed, then it is sufficient to simply loosen the small screw 40, or, alternatively, it is sufficient to alter the placement angle of the upper structure 10 relative to the base plate 4, more specifically, by extracting the small screw 40 from the attachment portion 32 and removing the upper structure 10 to a location above the attachment portion 32, and then altering the original placement angle of the upper structure 10 relative to the star-shape of the attachment portion 32 to a more appropriate placement angle, and then reattaching the upper structure 10 from above onto the attachment portion 32 at this new appropriate placement angle.

According to the implant structure 2 of the above-described present embodiment, if the first screws 6 are implanted in a bone such as a jawbone or the like, and the first attachment holes 24A and 24B are then engaged from the first surface 4$p$ with the engaging portions 14 which are protruding from this bone, then the base plate 4 can be attached to the first screws 6. In addition, if the male thread of each small screw 12 is screwed from the second surface 4$q$ of the base plate 4 into the female thread of each first screw 6, then the base plate 4 is fixed to the first screws 6. In this manner, the base plate 4 is gripped between the first screws 6 and the small screws 12, and is supported not by bone, but directly by the first screws 6. In contrast, by inserting the second screw 8 from the second surface 4$q$ of the base plate 4 through the second attachment hole 26, and implanting the portion thereof that protrudes from the front of the first surface 4$p$ in the direction of insertion into a bone such as a jawbone or the like, the base plate 4 is pressed by the second head portion 8$a$ of the second screw 8 from the second surface 4$q$ in the direction of the first surface 4$p$, and is also directly supported by the second screw 8. In this type of structure, the first screws 6 and the second screw 8 are prevented from coming loose from the bone, and are instead firmly fixed to the bone. In addition, the base plate 4 is not directly supported by bone, but is instead stably supported by the first screws 6 and the second screw 8. Because of this, any play can be eliminated from the base plate 4.

As has been described above, since the base plate 4 is not supported directly by bone, but is instead stably supported directly by the first screws 6 and the second screw 8, the upper structure 10, plates, and wires and the like can be stably fixed to the base plate 4.

According to the implant structure 2 of the present embodiment, as a result of the stoppers 16 being provided on the first screws 6, the base plate 4 is gripped in the thickness direction thereof between the stoppers 16 of the first screws 6 and the head portions 12$a$ of the small screws 12. Because of this, the base plate 4 can be supported more stably.

Moreover, according to the implant structure 2 of the present embodiment, the second screw 8 is provided with the abutting surface 18, and when the second screw 8 is inserted from the first surface 4$p$ through the base plate 4 towards the second surface 4$q$, the abutting surface 18 abuts against the seating surface 27. As a consequence, the surface area of the contact between the second screw 8 and the base plate 4 when the base plate 4 is pressed by the second head portion 8$a$ of the second screw 8 from the second surface 4$q$ in the direction of the first surface 4$p$ is increased. Because of this, the support provided to the base plate 4 by the second screw 8 is made more stable and stronger in the direction in which the base plate 4 is pressed from the second surface 4$q$ towards the first surface 4$p$.

Moreover, according to the implant structure 2 of the present embodiment, since the notch portions 30 are formed in the base plate 4, the plate portion can be bent in any desired direction around the portion where the notch portions 30 are formed. Accordingly, by changing the position and orientation of the attachment portion 32 in accordance with the orientation of this bend, the attachment portion 32 can be set in the attitude desired for the upper structure. Namely, the position of the attachment portion 32 can be easily adjusted so as to match the configuration and application of the upper structure 10 even after the base plate 4 has been fixed to a bone. Accordingly, since the task of attaching the base plate 4 is simplified, work efficiency is improved, and both labor and time taken can be reduced. Moreover, by changing the formation positions, the orientation, and the number of formation locations and the like of the notch portions 30 in the plate portion, the base plate can be bent to any desired configuration. Furthermore, the upper structure can be positioned in a desired attitude without the number of parts used having to be increased, unlike the case of a conventional structure. Consequently, there is no increase in the structural complexity of the implant structure 2, and a reduction in cost can also be achieved.

Moreover, according to the implant structure 2 of the present embodiment, since the plate portion of the base plate 4 has a simple elongated configuration, not only are the manufacturing and processing of the base plate 4 simplified, but the handling thereof when the implant structure 2 is being fixed to a bone can be made even easier. Moreover, according to the implant structure 2 of the present embodiment, since the notch portions 30 are formed in the base plate 4 by narrowing the width thereof, the plate portion can be easily bent around the locations where the width of the plate portion is formed more thinly.

By engaging the first attachment holes 24A and 24B from the first surface 4$p$ with the engaging portions 14 of the first screws 6 that are protruding from the bone, and screwing the male thread on the small screw 12 into the female thread in the first screws 6 from the second surface 4$q$, the base plate (i.e., the orthodontic implant jig) 4 of the above-described present embodiment is not supported by bone, but is supported above the bone by the first screws 6 and the small screws 12. Moreover, as a result of the second screw 8 being inserted from the second surface 4$q$ through the second mounting hole 26, and the portion that protrudes from the front of the first surface 4$p$ in the insertion direction being implanted in bone, the base plate 4 is pressed from the second surface 4$q$ in the direction of the first surface 4$p$, and is also directly supported by the second screw 8. Namely, according to the base plate 4 of the present embodiment, since the base plate 4 is not supported directly by bone, but is instead stably supported directly by the first screws 6 and the second screw 8, the various effects described above can be achieved.

A preferred embodiment of the present invention has been described above in detail, however, the present invention is not limited to this specific embodiment and various alterations and modifications and the like may be made thereto insofar as they do not depart from the spirit or scope of the present invention as described in the Claims.

Figure 13A:
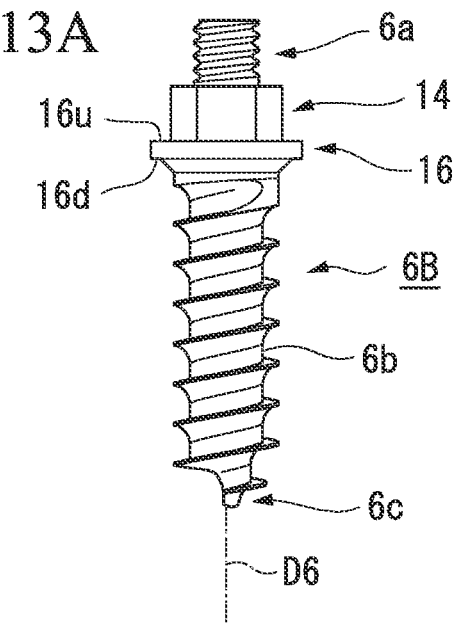
FIG. 13A is a side view representing the first screw, and shows a variant example of the first screw and a plate securing implement of the orthodontic implant structure according to an embodiment of the present invention.
Figure 13B:
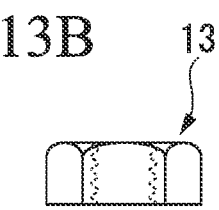
FIG. 13B is a side view representing a nut (i.e., the plate securing implement), and shows a variant example of the first screw and plate securing implement of the orthodontic implant structure according to an embodiment of the present invention.
Figure 13C:
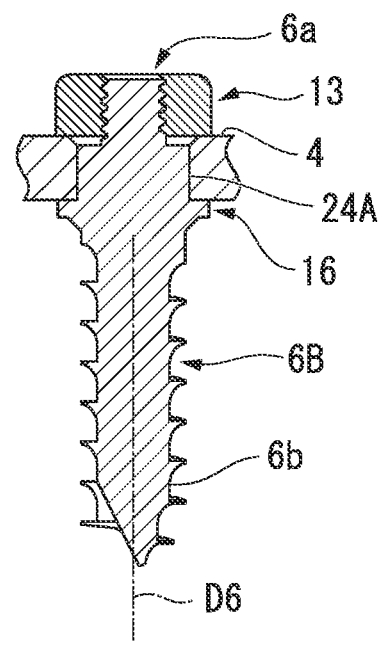
FIG. 13C is a cross-sectional view corresponding to when a cut is made in a direction that is parallel to the screw axial direction of the first screw through the center of the first screw while looking at the base plate, which has been fixed by the first screw and the nut, in plan view, and shows a variant example of the first screw and the plate securing implement of the orthodontic implant structure according to an embodiment of the present invention.

FIG. 13A through FIG. 13C are views showing variant examples of the first screws 6 and plate securing implements (namely, the small screws 12), with FIG. 13A being a side view representing a first screw 6B, FIG. 13B being a side view representing a nut (i.e., a plate securing implement) 13, and FIG. 13C being a cross-sectional view showing a cross-section when a cut is made in a parallel direction to the screw axial direction D6 of the first screw 6B through the center of the first screw 6B while looking at the base plate 4, which has been fixed by the first screw 6B and the nut 13, in plan view. Note that in FIG. 13A through FIG. 13C, component elements of the first screw 6B and the nut 13 that have similar functions to those of component elements of the first screw 6 and the small screw 12 are given the same descriptive symbols as those component elements of the first screw 6 and the small screw 12 and a description thereof is omitted.

As is shown in FIG. 13A, a male thread is formed on the first head portion 6a of the first screw 6B. In contrast, as is shown in FIG. 13B, a female thread is formed in the nut 13 that is used instead of the small screw 12 of the above-described embodiment as a plate securing implement. In a structure of this type, as is shown in FIG. 13C, the base plate 4 is attached to the first screw 6B by implanting the first screw body 6b of the first screw 6B in bone, in the same way as in the above-described embodiment, and engaging the first attachment hole 24A (or the first attachment hole 24B) from the first surface 4p with the engaging portion 14 which is protruding from this bone. The base plate 4 is then fixed to the first screw 6B by screwing the female thread of the nut 13 onto the male thread on the first head portion 6a of the first screw 6B from the second surface 4q of the base plate 4. In this way, the base plate 4 is gripped between the first screw 6B and the nut 13, and is supported not by bone, but directly by the first screw 6B. Accordingly, according to the structure of the first variant example, in the same way as in the above-described embodiment, the first screws 6 and the second screw 8 are prevented from coming loose from the bone, but are instead firmly fixed to the bone. In addition, the base plate 4 is not directly supported by bone, but is instead stably supported by the first screw 6B and the second screw 8. Because of this, any play can be eliminated from the base plate 4.

Figure 14A:
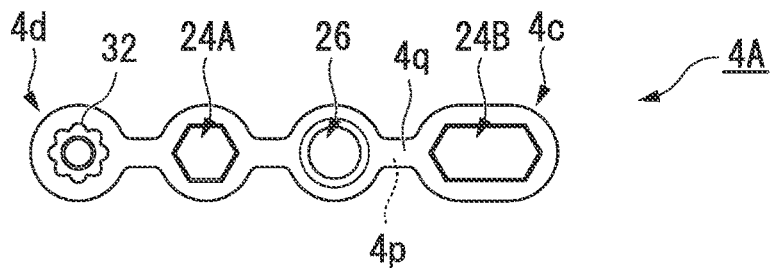
FIG. 14A is a plan view representing a first variant example of the base plate, and shows a variant example of the base plate (i.e., the orthodontic implant jig) according to an embodiment of the present invention.
Figure 14B:
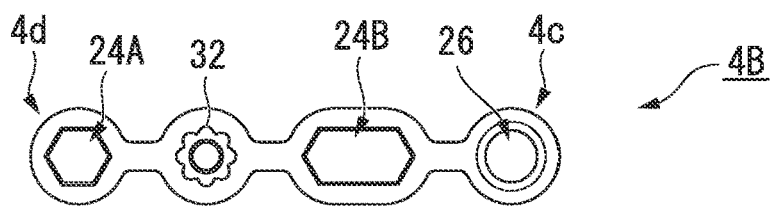
FIG. 14B is a plan view representing a second variant example of the base plate, and shows a variant example of the base plate (i.e., the orthodontic implant jig) according to an embodiment of the present invention.
Figure 14C:
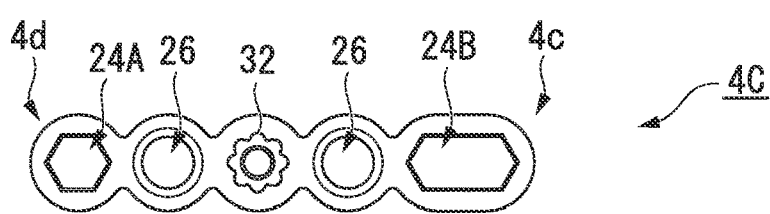
FIG. 14C is a plan view representing a third variant example of the base plate, and shows a variant example of the base plate (i.e., the orthodontic implant jig) according to an embodiment of the present invention.
Figure 14D:
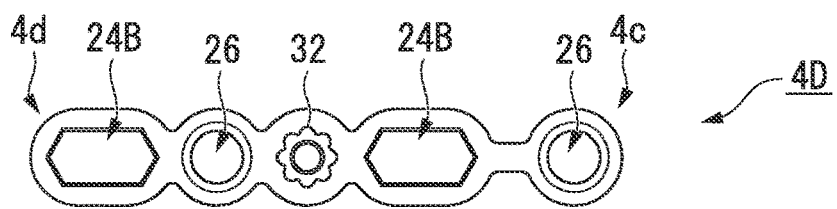
FIG. 14D is a plan view representing a fourth variant example of the base plate, and shows a variant example of the base plate (i.e., the orthodontic implant jig) according to an embodiment of the present invention.
Figure 14E:
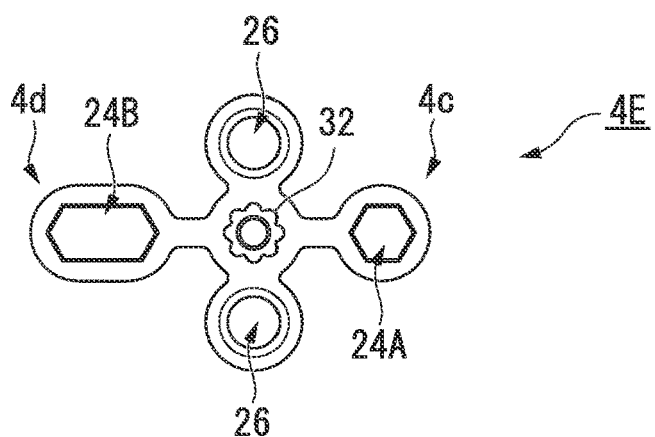
FIG. 14E is a plan view representing a fifth variant example of the base plate, and shows a variant example of the base plate (i.e., the orthodontic implant jig) according to an embodiment of the present invention.

FIG. 14A through FIG. 14E are views showing variant examples of the base plate 4, and are plan views showing a first variant example through to a fifth variant example of the base plate 4. As is shown in these drawings, the number and locations respectively of the first attachment holes, the second attachment hole, and the attachment portion 32 that are formed in the base plate 4 of the present invention are not particularly restricted, and may be suitably altered in accordance with the content of the orthodontic treatment. For example, as is shown in FIG. 14A, it is also possible for the attachment portion 32, the first attachment hole 24A, the second attachment hole 26, and the first attachment hole 24B to be formed in that sequence in the longitudinal direction from one end portion 4d of a base plate 4A of the first variant example towards another end portion 4c thereof. Additionally, as is shown in FIG. 14B, it is also possible for the first attachment hole 24A, the attachment portion 32, the first attachment hole 24B, and the second attachment hole 26 to be formed in that sequence in the longitudinal direction from the one end portion 4d of a base plate 4B of the second variant example towards the other end portion 4c thereof. Additionally, as is shown in FIG. 14C, it is also possible for the first attachment hole 24A, the second attachment hole 26, the attachment portion 32, the second attachment hole 26, and the first attachment hole 24B to be formed in that sequence in the longitudinal direction from the one end portion 4d of a base plate 4C of the third variant example towards the other end portion 4c thereof. Additionally, as is shown in FIG. 14D, it is also possible for the first attachment hole 24B, the second attachment hole 26, the attachment portion 32, the first attachment hole 24B, and the second attachment hole 26 to be formed in that sequence in the longitudinal direction from the one end portion 4d of a base plate 4D of the fourth variant example towards the other end portion 4c thereof. Furthermore, as is shown in FIG. 14E, it is also possible for a base plate 4E of the fifth variant example to extend in two mutually orthogonal directions. The first attachment hole 24B, the attachment portion 32, and the first attachment hole 24A are formed in that sequence in the direction of the long axis shown in FIG. 14E from the one end portion 4d towards the other end portion 4c in a first portion that extends in a first direction (i.e., in the direction of the long axis) out of the aforementioned two directions. On the other hand, the second attachment hole 26, the attachment portion 32 which is shared with the first portion, and the second attachment hole 26 are formed in that sequence in the direction of the short axis shown in FIG. 14E, which is orthogonal to the direction of the long axis, from one end portion towards another end portion in a second portion that extends in a second direction (i.e., in the direction of the short axis) out of the aforementioned two directions. In this way, the base plate 4 may be formed in shapes other than an elongated shape. The shape of the base plate 4 when seen in plan view is not particularly restricted, and may be suitably altered in accordance with the orthodontic treatment.

Namely, in the implant structure of the present invention, as a result of the base plate 4 being supported from below by the first screws 6 and 6B, and the first screws 6 and 6B and the base plate 4 being fixed in place by the plate securing implements 12 and 13, and the base plate 4 being supported from above by the second screw 8, thereby enabling the upper structure 10 to be attached to the base plate 4 via the attachment portion 32, the above-described effects are obtained. In addition, the design parameters of the base plate 4, the first screws 6, and the second screw 8 and the like are able to be freely altered in accordance with the contents of the orthodontic treatment.

INDUSTRIAL APPLICABILITY

According to the orthodontic implant structure of the present invention, it is possible to stably support a base plate. Moreover, according to the orthodontic jig of the present invention, this orthodontic jig can be used in the orthodontic implant structure, so that the effectiveness of orthodontic treatment performed using an upper structure, a plate, and wires and the like can be increased.

REFERENCE SIGNS LIST

2 Implant structure (Orthodontic implant structure)
4, 4A, 4B, 4C, 4D, 4E Base plate (Orthodontic implant jig)
4p First surface
4q Second surface
6, 6B First screw
6a First head portion (Head portion of first screw)

6b First screw body (Screw body of first screw)
8 Second screw
8a Second head portion (Head portion of second screw)
8b Second screw body
10 Upper structure
12 Small screw (Plate securing implement)
13 Nut (Plate securing implement)
14 Engaging portion
18 Abutting portion
24A, 24B First attachment holes
26 Second attachment hole
27 Seating surface
30, 30 Notch portions
32 Attachment portion
D6, D8 Screw axial directions

The invention claimed is:

1. An orthodontic implant structure that is used by being implanted in a bone inside an oral cavity comprising:
a plurality of first screws each one of which has a first head portion and a first screw body protruding from the first head portion, the first head portion having an engaging portion in which a thread is formed, and the first screw body for being implanted in the bone inside the oral cavity;
a plate securing implement that is capable of being screwed into the thread;
a second screw having a second head portion and a second screw body protruding from the second head portion, the second screw body for being implanted in the bone inside the oral cavity; and
a base plate having a first surface disposed for facing the bone inside the oral cavity and a second surface disposed on an opposite side from the first surface,
wherein a plurality of first attachment holes and a second attachment hole are formed in the base plate, each one of the plurality of first attachment holes with which the engaging portion is capable of being engaged from the first surface, the second attachment hole into which the second screw is capable of being inserted from the second surface and with which the second head portion of the second screw is capable of being locked from the second surface,
wherein the base plate includes an elongated plate portion where the plurality of first attachment holes are formed in a line along a longitudinal direction,
wherein the base plate is configured to be supported in a direction from the first surface towards the second surface not by the bone but by the plurality of first screws and configured to be supported in a direction from the second surface towards the first surface by the second screw,
wherein each one of the plurality of first screws is provided with a stopper protruding from an end portion of the first screw body close to the first head portion in a radial direction orthogonal to a screw axial direction,
the base plate includes a first portion and a second portion other than the first portion, the first portion which is provided with the second attachment hole and which is offset and parallel to a plane where the second portion extends such that the first portion protrudes from the second portion in a direction in which the second screw protrudes from the first surface when the second screw is inserted into the second attachment hole, and
a protrusion height of the first portion is equivalent to thickness of the stopper.

2. The orthodontic implant structure according to claim 1, wherein each one of the plurality of first screws is provided with a stopper protruding from an end portion of the first screw body close to the first head portion in a radial direction orthogonal to a screw axial direction.

3. The orthodontic implant structure according to claim 1, wherein a seating surface whose diameter becomes wider moving from the first surface towards the second surface is formed on a side wall defining the second attachment hole, and
the second head portion of the second screw has an abutting surface that abuts against the seating surface.

4. The orthodontic implant structure according to claim 1, wherein
the plurality of first attachment hole, the second attachment hole, and an attachment portion to which an upper structure that is used for orthodontic treatment is removably attached are formed in a line along the longitudinal direction in the elongated plate portion of the base plate, and
a notch portion is formed between at least one of the plurality of first attachment holes or the second attachment hole and the attachment portion in the elongated plate portion of the base plate, the notch portion enabling the elongated plate portion of the base plate to be bent in a desired direction.

5. The orthodontic implant structure according to claim 4, wherein the notch portion is formed by reducing a width of the elongated plate portion of the base plate at a predetermined location of the elongated plate portion of the base plate.

6. The orthodontic implant structure according to claim 1, wherein at least one of the plurality of first attachment holes forms an elongated hole whose sides that extend in parallel with the longitudinal direction, and
each one of the rest of the plurality of first attachment holes forms a hole having an inner circumferential surface formed in the same cross-sectional shape as a shape of the engaging portion when seen in a plan view.

7. The orthodontic implant structure according to claim 1, wherein each one of the plurality of first attachment holes forms an elongated hole whose sides that extend in parallel with the longitudinal direction.

8. The orthodontic implant structure according to claim 1, wherein the number of the plurality of first attachment holes are two,
one of the two first attachment holes forms an elongated hole whose sides that extend in parallel with the longitudinal direction, and
the other one of the two first attachment holes forms a hole having an inner circumferential surface formed in the same cross-sectional shape as a shape of the engaging portion when seen in a plan view.

9. The orthodontic implant structure according to claim 1, wherein the number of the plurality of first attachment holes are two,
each one of the two first attachment holes forms an elongated hole whose sides that extend in parallel with the longitudinal direction.

10. An orthodontic implant jig for being fixed indirectly to a bone inside an oral cavity using:
a plurality of first screws each one of which has a first head portion, a first screw body protruding from the first head portion, and a stopper, the first head portion having an engaging portion where a thread is formed, the first screw body for being implanted in the bone inside the oral cavity, and the stopper protruding from an end portion of the first screw body close to the first head portion in a radial direction orthogonal to a screw axial direction,
a plate securing implement that is capable of being screwed into the thread, and
a second screw having a second head portion and a second screw body protruding from the second head portion and for being implanted in the bone inside the oral cavity,
the orthodontic implant jig comprising:
a base plate having a first surface disposed for facing the bone inside the oral cavity and a second surface disposed on an opposite side from the first surface,
wherein a plurality of first attachment holes and a second attachment hole are formed in the base plate, each one of the plurality of first attachment holes with which the engaging portion is capable of being engaged from the first surface and enabling the plate securing implement to be screwed into the thread, the second attachment hole into which the second screw is capable of being inserted from the second surface and with which the second head portion of the second screw is capable of being locked from the second surface,
wherein the base plate includes an elongated plate portion where the plurality of first attachment holes are formed in a line along a longitudinal direction,
wherein the base plate is configured to be supported in a direction from the first surface towards the second surface not by the bone but by the plurality of first screws and configured to be supported in a direction from the second surface towards the first surface by the second screw, and
wherein the base plate includes a first portion and a second portion other than the first portion, the first portion which is provided with the second attachment hole and which is offset and parallel to a plane where the second portion extends such that the first portion protrudes from the second portion in a direction in which the second screw protrudes from the first surface when the second screw is inserted into the second attachment hole, and
a protrusion height of the first portion is equivalent to thickness of the stopper.

* * * * *